United States Patent
Tadmor

(10) Patent No.: US 8,649,551 B2
(45) Date of Patent: Feb. 11, 2014

(54) METHOD AND APPARATUS TO HIGHLIGHT INFORMATION IN COMPLEX VISUAL ENVIRONMENTS

(75) Inventor: Yoav Tadmor, Newcastle Upon Tyne (GB)

(73) Assignee: University of Newcastle Upon Tyne (GB)

( * ) Notice: Subject to any disclaimer, the term of this patent is extended or adjusted under 35 U.S.C. 154(b) by 1329 days.

(21) Appl. No.: 10/594,870

(22) PCT Filed: Mar. 30, 2005

(86) PCT No.: PCT/GB2005/001152
§ 371 (c)(1),
(2), (4) Date: Sep. 21, 2007

(87) PCT Pub. No.: WO2005/096128
PCT Pub. Date: Oct. 13, 2005

(65) Prior Publication Data
US 2008/0219493 A1  Sep. 11, 2008

(30) Foreign Application Priority Data
Mar. 30, 2004 (GB) .................................. 0407194.0

(51) Int. Cl.
*G06K 9/00* (2006.01)
(52) U.S. Cl.
USPC ........... 382/100; 382/113; 382/114; 382/173; 382/254; 382/282; 345/619; 345/629; 345/634; 345/639; 348/578

(58) Field of Classification Search
None
See application file for complete search history.

(56) References Cited

U.S. PATENT DOCUMENTS 6,141,442 A    10/2000  Chen
6,373,499 B1 *  4/2002  Acker ........................... 345/619

(Continued)

FOREIGN PATENT DOCUMENTS

EP  1107166    6/2001
GB  2363934 A  10/2000

(Continued)

OTHER PUBLICATIONS

Weinmann et al. Photoshop 6 for Windows and Macintosh: Visual QuickStart Guide, Jan. 25, 2001, Peachpit Press.*

(Continued)

*Primary Examiner* — Matthew Bella
*Assistant Examiner* — Jason Heidemann
(74) *Attorney, Agent, or Firm* — Schwegman Lundberg & Woessner, P.A.

(57) ABSTRACT

An image processing system is described which is arranged to highlight information in image displays by selectively blurring less important areas of an image. By generating such displays comprising areas which are in focus and areas which are out of focus, a viewer's attention is preferentially drawn towards those areas of an image which appear sharp. By having a display system which is arranged to generate such images a means is provided to direct a viewer's attention towards considering the sharp areas of the image display first. Further the selective blurring portions of an image reduces rather than increases the amount of information presented to a viewer and hence reduces the likelihood that a viewer will become overloaded with information. Display systems of this type are therefore especially applicable to complex control environments as means of directing viewer's attention.

6 Claims, 12 Drawing Sheets

(56) References Cited

U.S. PATENT DOCUMENTS

| 6,462,785 | B1 | | 10/2002 | Carraro et al. | |
|---|---|---|---|---|---|
| 7,027,659 | B1 | * | 4/2006 | Thomas | 382/254 |
| 2002/0147782 | A1 | * | 10/2002 | Dimitrova et al. | 709/207 |
| 2003/0193582 | A1 | * | 10/2003 | Kinjo | 348/231.99 |
| 2004/0001220 | A1 | * | 1/2004 | Gorday et al. | 358/1.15 |

FOREIGN PATENT DOCUMENTS

| WO | 200064169 | 10/2000 |
|---|---|---|
| WO | WO-00/64169 A1 | 10/2000 |
| WO | 03/049035 | 6/2003 |
| WO | WO-2005096128 A2 | 10/2005 |

OTHER PUBLICATIONS

Stone et al., "The movable filter as a user interface tool" 1994, In Proceedings of ACM CHI'94 Conference on Human Factors in Computing Systems, vol. 1 of Information Visualization, pp. 306-312.*
Kosara et al., "Semantic depth of field", 2001, In Proceedings of the IEEE Symposium on Information Visualization 2001 (InfoVis2001). IEEE, Oct. 22-23.*
Lieberman. "A multi-scale, multi-layer, translucent virtual space", Sep. 1997, IEEE.*
Mills et al., "A magnifier tool for video data", 1992, Proceedings of Chi '92, ACM, New York, pp. 93-98.*
Colby et al., "Transparency and blur as selective cues for complex visual information" 1991. In SPIE vol. 1460, Image Handling and Reproduction Systems Integration, pp. 114-125.*
Kosara et al., "Useful properties of Semantic Depth of Field for better F+C visualization", 2002, Proceedings of the symposium on Data Visualization, Eurographics Association, 205-210.*
Giller et al., ". Experimental evaluation of semantic depth of field, a preattentive method for focus+context visualization.", 2001, Technical Report TR-VRVis-2001-021, VRVis Research Center.*
Gleicher et al. "A Framework for Virtual Videography", Jun. 11-13, 2002 ACM, Int. Symp. on Smart Graphics.*
Gleicher et al. "Towards Virtual Videography", Nov., 2000, ACM Multimedia 2000.*
Wallick et al. "Marker and Chalkboard Regions.", Mar. 2005, Proceedings of Mirage 2005.*
Alex Evans, "Four Tricks for Fast Blurring in Software and Hardware," Gamasutra.com, Feb. 9, 2001, http://www.gamasutra.com/features/20010209/evans_01.htm.
Kosara et al,"Focus+Context Taken Literally," Information Visualization, pp. 22-29 (2002).
Kosara et al, "Useful Properties of Semantic Depth of Field for Better F+C Visualization," Symposium on Visualization (2002).
Kosara et al, "Semantic Depth of Field".
Kosara, "Semantic Depth of Filed—Using Blur for Focus+Context Visualization," PhD Thesis, pp. 1-88.
Kosara, et al, "Focus and Context Taken Literally," pp. 1-9.
Kosara, et al, "Semantic Depth of Field," pp. 1-8.
Giller, et al, "Experimental Evaluation of Semantic Depth of Field, a Preattentive Method for Focus+Context Visualization".
Kosara et al., Focus+Context Taken Literally, Information Visualization, IEEE Computer Graphics and Applications, Jan./Feb. 2002, pp. 22-29.
Kosara et al., Useful Properties of Semantic Depth of Field for Better F+C Visualization, joint Eurographics, IEEE TCVG Symposium on Visualization, 2002.
Kosara et al., Semantic Depth of Field.
Kosara, Robert, Semantic Depth of Field—Using Blur for Focus+Context Visualization, PhD Thesis.
Kosara et al., Focus and Context Taken Literally, pp. 1-9.
Kosara et al., Semantic Depth of Field, pp. 1-8.
Giller et al., Experimental Evaluation of Semantic Depth of Field, a Preattentive Method for Focus+Context Visualization.

* cited by examiner

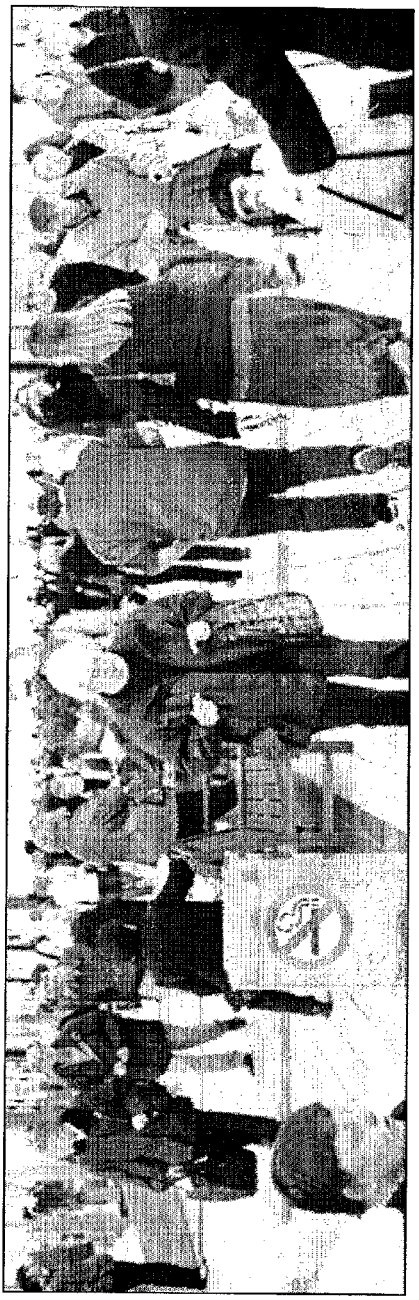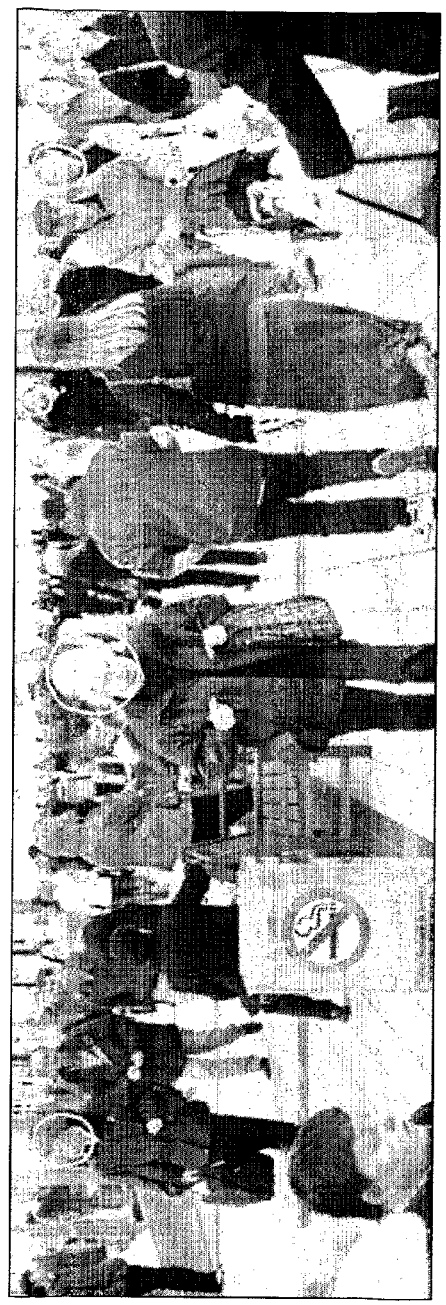
Fig.9A.
Fig.9B.

Detection of 3 items in a coloured display

METHOD AND APPARATUS TO HIGHLIGHT INFORMATION IN COMPLEX VISUAL ENVIRONMENTS

The present application concerns image processing systems. Embodiments of the present application concern image processing systems for generating display data.

Many circumstance require portions of an image display to be highlighted or emphasised. Thus for example in an aeroplane cockpit, it may be necessary to draw a pilot's attention to a reading on a particular gauge. Conventionally highlighting a portion of an image display has been achieved in a number of different ways including changing the colour of a portion of a display or alternatively highlighting an aspect of a display by using flashing lights or flashing display items etc.

A problem with existing methods for highlighting information is that the use of additional colour or a blinking light increases the overall information content and thereby the cognitive load on a user. As a result, in a complex visual environment such as within a cockpit, although flashing lights and different colours may help direct a pilot's attention, the increased amount of information can prevent or slow down a pilot from filtering the information appropriately and therefore may lead a pilot to miss other information that is necessary for safe flight.

A similar problem of information overload can arise with in-car navigation systems. When driving, a driver's attention should mainly be directed towards the driving conditions on the road. Highlighting information on an in-car navigation screen by way of blinking lights or garish colours can distract a driver's attention and is therefore potentially dangerous.

An alternative system for generating image displays in which portions of a display are brought to a user's attention but which do not increase the cognitive load on a viewer is therefore desirable.

In accordance with one aspect of the present invention there is provided a method of generating image data comprising the steps of: receiving an original image; receiving data identifying portions of an original image to be highlighted; and generating image data representative of a composite image wherein portions of said composite image corresponding to portions of image to be highlighted correspond to said portions of said original image and the remaining portions of said composite image correspond to corresponding portions of said original image to which a blurring function has been applied.

Further objects and aspects of the present invention will become apparent with reference to the following description and accompanying drawings, in which:

FIGS. 9A-9D are exemplary illustrations of images where a number of individuals are highlighted;

First Embodiment

A first embodiment of the present invention will now be described with reference to FIGS. 1, 2, 3A-C and FIG. 4.

Figure 1:
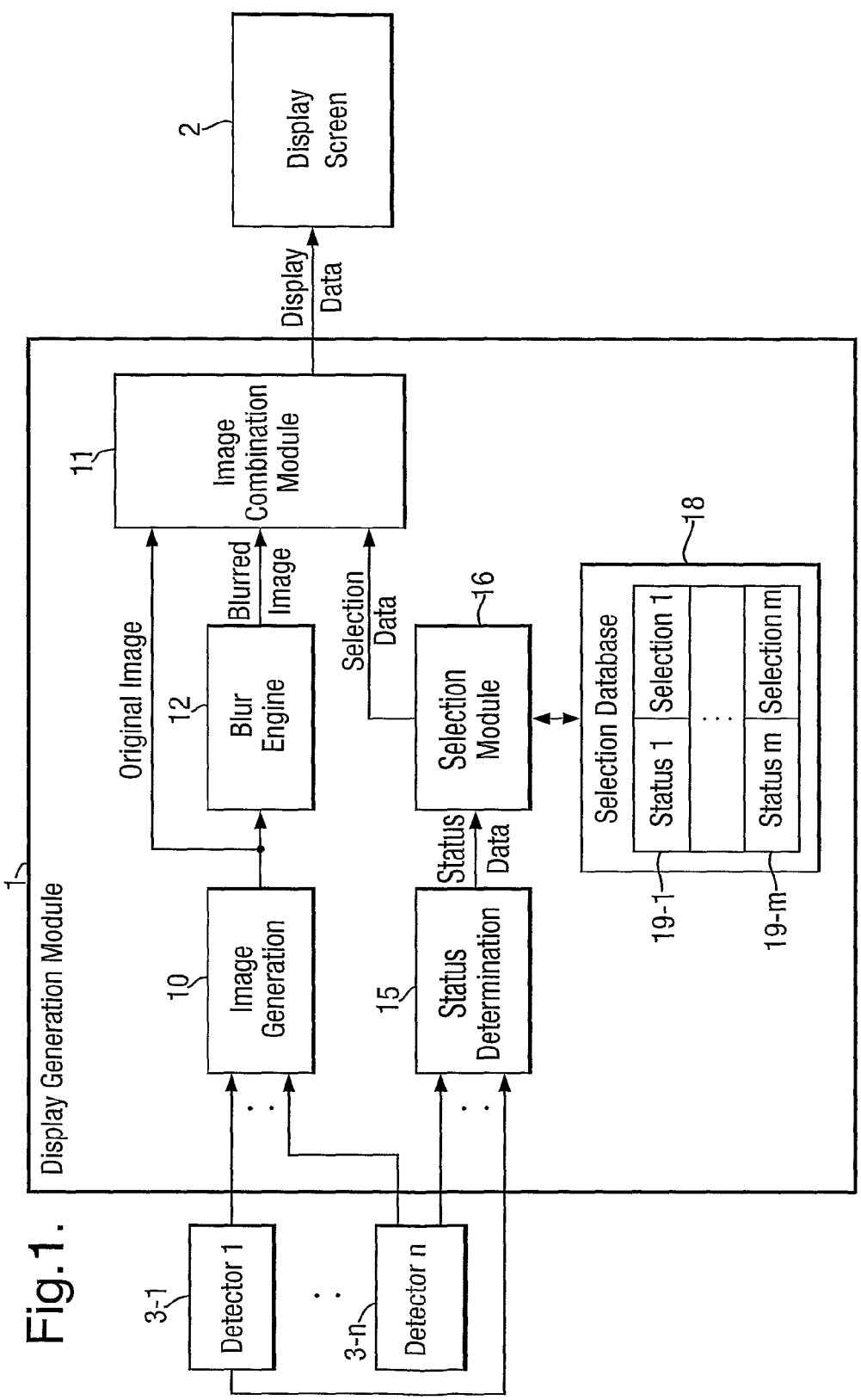
FIG. 1 is a schematic block diagram of a display system including an image generation module in accordance with a first embodiment of the present invention.

Referring to FIG. 1, which is a schematic block diagram of a display system for an aeroplane cockpit, a display system is provided comprising a display generation module 1 arranged to generate display data, which is displayed on a display screen 2. In addition to being connected to the display screen 2, the display generation module 1 is also connected to a number of detectors 3-1-3-N. These detectors 3-1-3-N comprise conventional aeroplane detectors for detecting wind speed, altitude etc. As in a conventional display system, the display generation module 1 is arranged to receive signals from the detectors 3-1-3-N and generate screen display data representing the readings from the detectors 3-1-3-N, which are then shown on the display screen 2.

In addition to generating conventional screen displays, in accordance with the present invention, the display generation module 1 is also arranged to generate display data for screen displays in which portions of the display are highlighted in a manner, which does not increase the cognitive load on a pilot.

More specifically, in this embodiment, the display generation module 1 is arranged to determine whether the inputs received from the detectors 3-1-3-N are such that a pilot's attention should be drawn to a particular portions of a generated display. If this is the case, instead of displaying a normal image, the display generation module 1 generates a composite image in which less important areas on a display appear slightly blurred whilst important areas, which are to be emphasised, remain sharp.

The applicants have established that when confronted with images comprising areas, which are in focus, and areas, which are out of focus, a viewer's attention is preferentially drawn towards those areas of an image, which appear sharp. It has therefore been appreciated that by generating combined images in which certain portions of an image remain sharp and other areas appear more blurred, a means is provided to direct a viewer's attention toward considering the sharp areas of an image first.

It is believed that this effect arises for the following reasons. During natural vision in a 3D environment, whenever a viewer chooses to attend to an object or to a particular region in space, the viewer will point his eyes to the particular location of interest. The rest of the surrounding scene is then blurred (by the eyes optics and/or by neural mechanisms). Ordinarily, a viewer will be unaware of this blurring effect due to the processing of an image by the viewer's brain.

As the neural mechanisms that control spatial attention and eye movements can be controlled independently from each other; the location to which a viewer chooses to attend need not coincide with the location to which the viewer points his eyes. The applicants believe that by selectively blurring the background (or any undesired regions in an image) it is possible to guide a viewer's eyes and their spatial attention to point to the same spatial location(s) in an image at the same time.

Selectively blurring areas of an image display therefore provides means for guiding a viewer's attention towards the sharper areas of an image and hence a means for directing a viewer's attention towards information that is currently identified as important.

Further, in contrast to conventional methods for highlighting information, the selective blurring of portions of an image reduces rather than increases the amount of information presented to a viewer. The present invention therefore enables information to be highlighted in a manner, which reduces the likelihood that a viewer will become overloaded with information. The present invention is therefore particularly applicable to displays within aircraft or motor vehicles or the like where it is desirable to highlight information whilst not overly diverting the attention of a pilot or driver.

Figure 2:
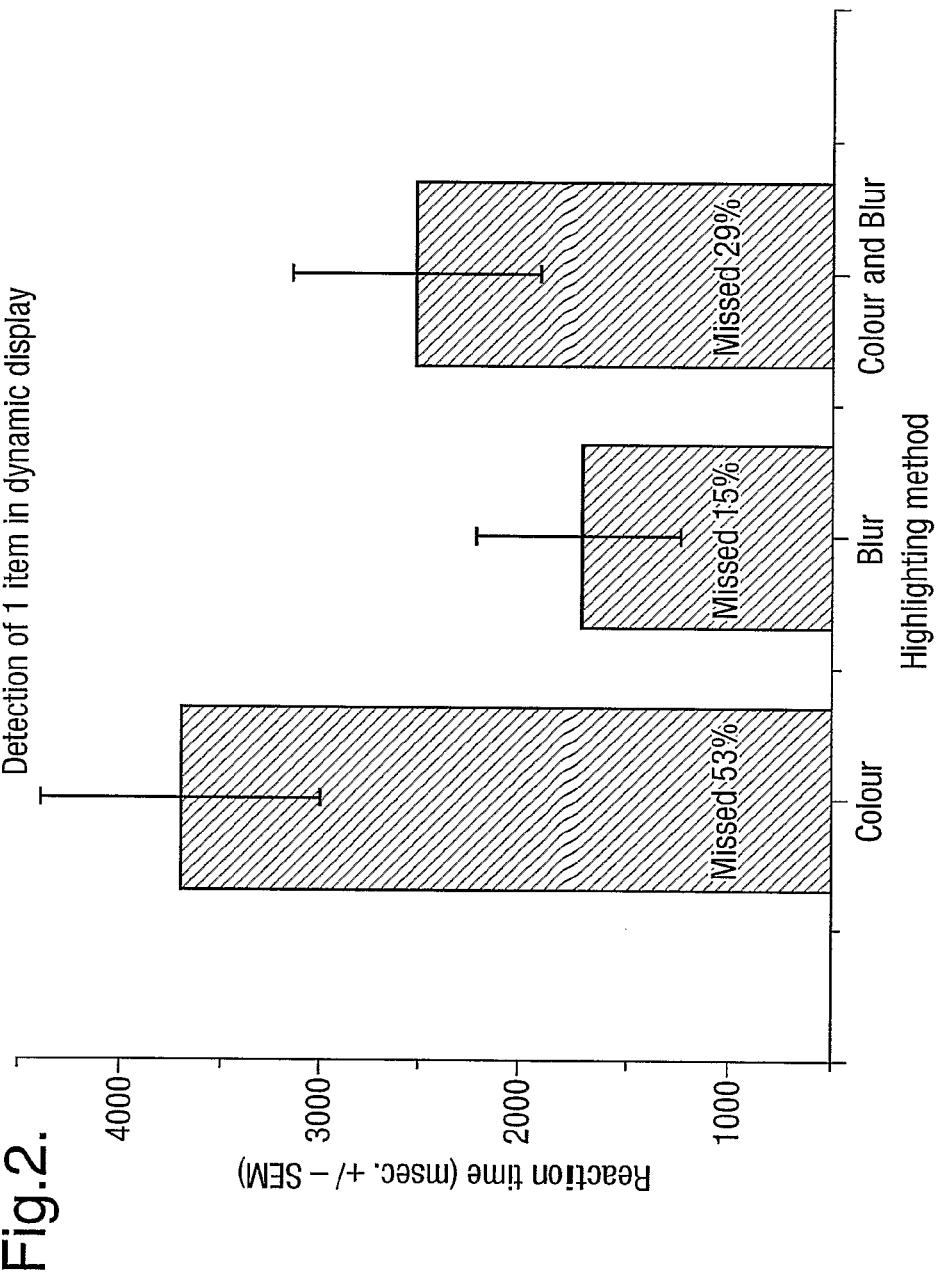
FIG. 2 is a graph of experimental results illustrating the effect of sensory overload on reaction time.

FIG. 2 is a graph illustrating experimental results demonstrating the problems for adding further information leading to sensory overload of a user.

In the experiment, subjects were made to view a rapidly changing sequence of double digit numbers arranged in a five-by-five array. Each array was presented for 190 milliseconds and the colours and the numbers were changed randomly between the different arrays. On each presentation only one of the numbers in the array was highlighted and on different trials the item was highlighted using one of three methods: highlighting with a coloured ring alone, highlighting by blurring the rest of the array or highlighting with a combination of a coloured ring and blurring the rest of the image. Subjects were shown the target number at the beginning of each presentation sequence and were asked to press a button as soon as they detected this target number in the stimulus. A computer controlled high resolution timer was used to record how long it took each subject to respond correctly. If a subject failed to detect the target, the sequence was repeated. If they failed again, the run was terminated and their reaction time was taken to be the trial's duration.

As can be seen from FIG. 2, highlighting an item with a coloured ring was the least efficient highlighting method with subjects failing to detect a target in 53% of cases. Highlighting using selective blur caused detection rates to improve to 85% and additionally caused reaction times to increase. Adding the additional stimulus of coloured outlining to a selectively blurred display however caused both reaction times and error rates to increase. These results support the hypothesis that in contrast to conventional highlighting methods selective blurring of an image provides a means for highlighting which does not add sensory information and hence is particularly effective in environments such as cockpits or vehicles where sensory overload can be a problem.

In this embodiment, the display generation module 1 comprises an image generation module 10, which is arranged to receive signals from the detectors 3-1-3-N and generate original images comprising a bank of dials representing readings from the detectors 3-1-3-N.

Figure 3A:
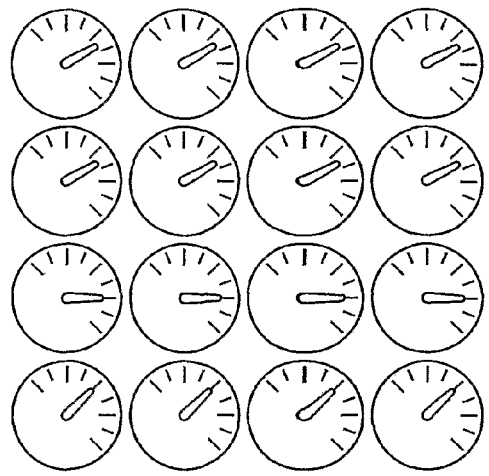
FIG. 3A is an exemplary illustration of an original image showing a bank of 16 dials.

An exemplary illustration of a bank of 16 dials representing readings from 16 detectors is illustrated as FIG. 3A.

The generated images are then passed by the image generation module 10 both to an image combination module 11 and to a blur engine 12. The blur engine 12 processes the received original images from the image generation module 10 to generate blurred images from the original images. These blurred images are also passed to the image combination module 11.

Figure 3B:
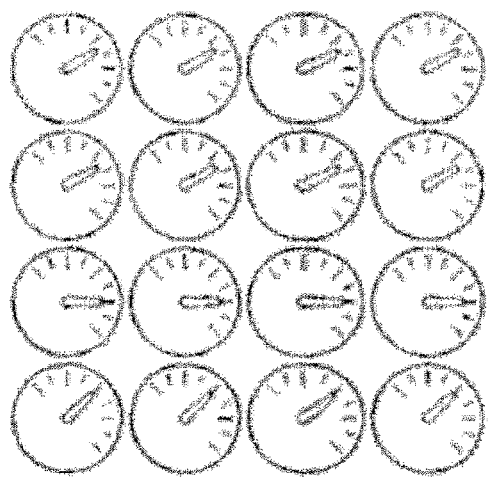
FIG. 3B is an exemplary illustration of the image of FIG. 3A to which a blurring function has been applied.

FIG. 3B is an exemplary illustration of a blurred image generated by processing the original image of FIG. 3A.

Ordinarily when the image combination module 11 receives original image data from the image generation module 10, the image combination module 11 passes display data corresponding to the received original image to the display screen 2. This causes a sharp display to be shown to a user.

However, in certain circumstance when the display generation module 1 determines that a pilot's attention should be directed to a limited subset of the dials, the image combination module 11 instead generates a hybrid image, which is passed to the display screen 2. These hybrid images comprise images in which portions of the image correspond to portions of a blurred image generated by the blur engine 12 and other portions of the image correspond to the original image generated by the image generation module 10.

Figure 3C:
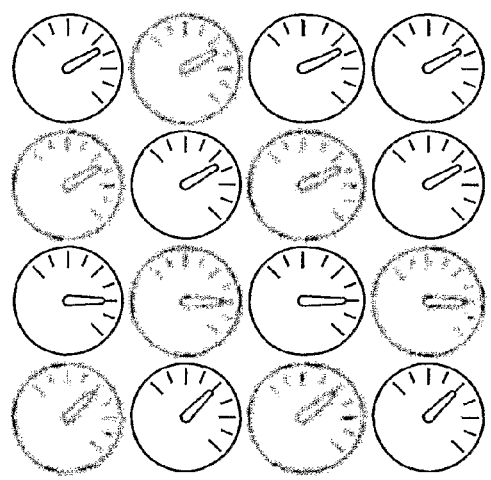
FIG. 3C is an exemplary illustration of a composite image of the bank of 16 dials of FIGS. 2A and 2B in which some of the dials of the composite image have been highlighted by selectively combining portions of the images of FIGS. 3A and 3B.

FIG. 3C is a schematic illustration in which some of the dials correspond to dials in the original image FIG. 3A whereas others correspond to dials appearing in FIG. 3B.

As will become apparent looking at FIG. 3C, a viewer's attention is drawn to the sharper portions of the image and hence generating a combined image in this way enables the display generation module 1 to direct the viewer's attention to specific readings of the dials.

Further, it will be appreciated that as the generation of this image does not increase the amount of information presented to a user, the highlighting of areas of a generated display in this manner does not increase cognitive load and is therefore a relatively unobtrusive way in which to highlight information within a cockpit.

In order to determine when it is appropriate to highlight certain information on the display screen, the display generation module 1 in this embodiment also comprises a status determination module 15 which is arranged to receive signals from the detectors 3-1-3-N and identify when the readings from the detectors 3-1-3-N indicate that certain dials on the display should be highlighted.

The status determination module 15 then outputs status data to a selection module 16 which is connected to a selection database 18 storing a series of records 19-1-19-M each comprising status data and selection data where the status data identifies a status which can be output by the status determination module 15 and the selection data comprises data identifying areas of a display to be highlighted.

When the selection module 16 receives status data from the status determination module 15, the selection module 16 accesses the selection database 18 and retrieves the record 19-1; 19-M having status data corresponding to the status data received from the status determination module 15 and passes this selection data to the image combination module 11 to identify areas of the screen display which are to be highlighted.

Figure 4:
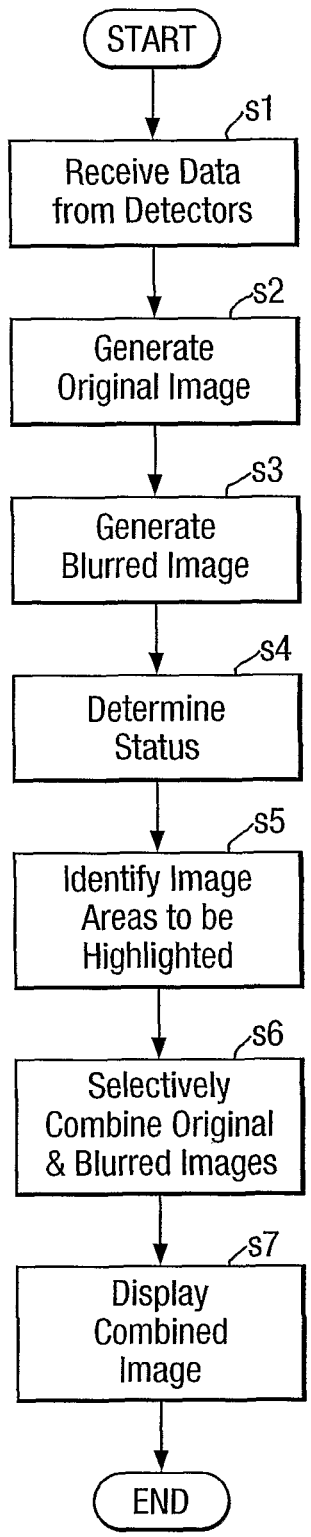
FIG. 4 is a flow diagram of the processing of the image generation module of FIG. 1.

The processing undertaken by the display generation module 1 will now be described in greater detail with reference to FIG. 4, which is a flow diagram of the processing performed by the display generation module 1.

When an image is to be displayed on the display screen 2, initially (s1) the display generation module 1 receives data from the detectors 3-1-3-N. These readings are passed to both the image generation module 10 and the status determination module 15.

When readings from the detectors 3-1-3-N are received by the image generation module 10, the image generation module 10 proceeds to generate (s2) image data for an original screen display in which the readings are illustrated. In this embodiment, this image comprises an image by a series of dials indicating the detected readings. This image of dials indicating the detected readings is then passed by the image generation module 10 to both the image combination module 11 and the blur engine 12.

When image data is received by the blur engine, the blur engine 12 processes the image to generate (s3) a blurred image corresponding to the received original image. In this embodiment this blurred image is obtained in a conventional manner by processing an original image pixel by pixel and calculating corresponding pixel values in a blurred image by determining the weighted average of pixel values in the same vicinity as an original pixel in an original image where the weighting of pixel values is based on a Gaussian function which declines with the distance between a pixel for which image data is being generated and the pixel for which a contribution is being calculated.

At the same time as when the image generation module 10 receives readings from the detectors 3-1-3-N, the same readings are also passed to the status determination module 15. When readings are received by the status determination module 15, the status determination module 15 processes the received readings to determine (s4) whether the readings from the detectors 3-1-3-N are such to indicate that a pilot's attention should be focussed on a limited number of the dials in the generated image for the display screen 2. The status determination module 15 then outputs status data. The status data will either identify a default status indicating that there is no particular need for a pilot to focus on specific readings within the screen display or a specific status determined from the received readings. The generated status data is then passed to the selection module 16.

When the selection module 16 receives status data, initially the selection module 16 checks whether the received status data indicates a default status. If this is the case the selection module 16 passes selection data to the image combination module 11 to cause the image combination module 11 to pass original image data received from the image generation module 10 the display screen 2.

If the status data received by the selection module does not indicate a default status, the selection module 16 then (s5) accesses the selection database 18 and retrieves from the selection database 18 a record 19-1; . . . ; 19-M having status data corresponding to the status data received from the status determination module 15. The selection module 16 then passes selection data corresponding to the selection data included in the retrieved record 19-1; . . . ; 19-m to the image combination module. This selection data will identify certain areas of an image that are to be highlighted within the image on the display screen 2.

When the image combination module 11 receives selection data from the selection module 16, if the selection data indicates a default selection, the image combination module 11 passes as display data a copy of the original image data received from the image generation module 10. This original image is then displayed (s7) on the display screen 2.

If instead the selection data identifies a series of areas in a display which are to be highlighted, the image combination module 11 generates display data by copying the original image data received from the image generation module 10 to generate (s6) image data for the areas of an image which are identified as to be highlighted and copying image data for the remaining areas from the blurred image received from the blur engine 12. The resultant combined image is then output and displayed (s7) on the display screen 2.

Where the image displayed on the display screen 2 is a combination of blurred and sharp areas, the viewer's eye will be drawn toward the sharper areas of the display and hence by presenting a viewer with a combined image, a means is provided to draw the viewer's attention to certain aspects of the display.

Should a viewer wish to review the entirety of the display, where the blur engine 12 generates a blurred image, which does not significantly degrade the visual information, contained in blurred areas of the display, this will remain possible.

Alternatively, a viewer could be provided with an override button monitored by one of the Detectors 3-1-3-N. When such an override button was depressed, the status determination module 15 could then be caused to generate the status data indicating a default status so that the display screen 2 displays an original image in which the entirety of the image appears sharp.

Second Embodiment

Figure 5:
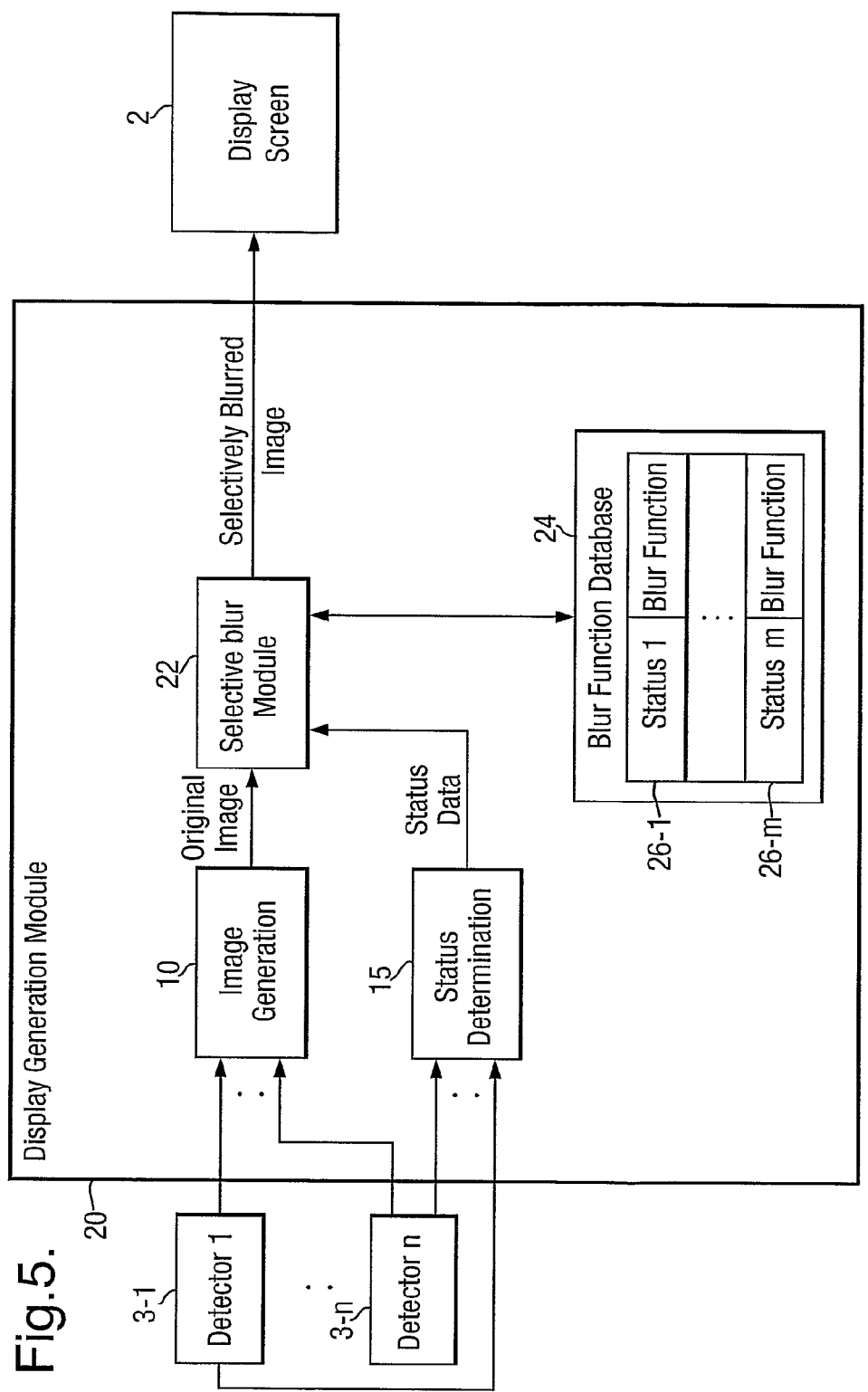
FIG. 5 is a schematic block diagram of a display system including an image generation module in accordance with a second embodiment of the present invention.

A second embodiment of the present invention will now be described with reference to FIG. 5, which is a schematic block diagram of a display system embodying the present invention.

In this embodiment the display generation module 1 of the first embodiment is replaced by a modified display generation module 20 in which the image combination module 11, blur engine 12, selection module 16 and selection database 18 are replaced by a selective blur module 22 and a blur function database 24. The remaining aspects of this embodiment are exactly the same as has been described in the first embodiment and are indicated by the same reference numerals as those appearing in FIG. 1.

In this embodiment, the selective blur module 22 is arranged to receive original image data from the image generation module 10 and status data from the status determination module 15. When status data received by the selective blur module 22 indicates a default status, the selective blur module 22 passes original image data received from the image generation module 10 to the display screen 2 in an unmodified form.

In contrast, when received status data does not indicate a default status, the selective blur module 22 accesses the blur function database 24 to retrieve a record 26-1; . . . 26-M stored within the blur function database 24. In this embodiment, each of these records 26-1; . . . 26-M comprises status data and a blur function. When the blur function database 24 is accessed by the selective blur module 22 the selective blur module 22 retrieves the record 26-1; . . . 26-M from the blur function database 24 having status data corresponding to the status data received by the selective blur module 22 from the status determination module 15. The selective blur module 22 then utilises the blur function of the record 26-1; . . . 26-M retrieved from the blur function database 24 to process the original image data received from the image generation module 10.

More specifically, in this embodiment each of the records 26-1; . . . ; 26-M stored within the blur function database 24 contains blur function data identifying how a selectively blurred image is to be generated from an original image received by the selected blur module 22.

Thus for example for areas of an image which are to be represented as sharp portions of an image, the blur function of the record will comprise a function identifying that pixels in a selectively burred image corresponding to pixels in these areas should be copies of the image data for corresponding pixels in an original image received from the image generation module 10.

Conversely, for pixels in an image, which are to be represented as blurred portions in a selectively blurred image, the blur function data will identify how pixel data in the blurred areas of the selectively blurred image are to be derived from groups of pixels in an original image received from the image generation module 10.

When the selective blur module 22 has processed an entire image using retrieved blur function data a selectively blurred image is then passed to the display screen 2 where it is displayed.

By having the selective blur module 22 process different areas of an original image in different ways, in contrast to the first embodiment where an entire blurred image is generated by a blur engine 12, the processing performed by the display generation module 20 is reduced as blurred image data is only generated for selected areas of an original image.

Third Embodiment

A third embodiment of the present invention will now be described with reference to FIG. 6 which is a schematic block diagram of a in-car navigation system embodying the present invention.

Figure 6:
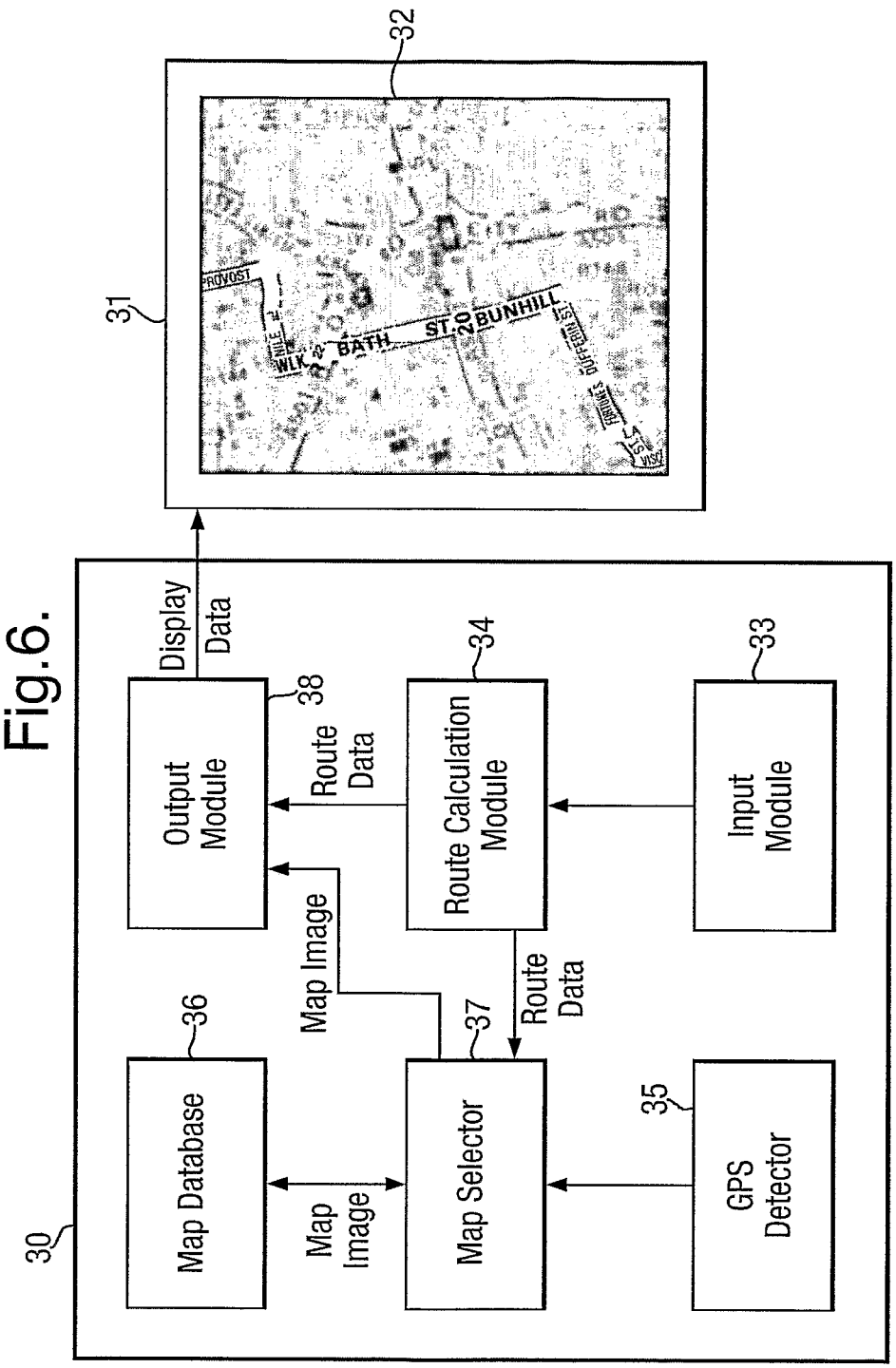
FIG. 6 is a schematic block diagram of an in-car navigation system in accordance with a third embodiment of the present invention.

As is shown in FIG. 6, an in-car navigation system 30 is provided that is connected to a display 31 which is arranged to display maps 32 to a driver to enable the driver to identify a route to a desired destination.

As in a conventional in-car navigation system, the in-car navigation system comprises an input module 33 for enabling a user to identify their desired destination; a route calculation module 34 for determining a route from a car's current location to the desired final destination; a GPS detector 35 to enable the in-car navigation system to identify a car's present location; a map database 36 for storing map images for display and a map selector 37 arranged to utilise the current position signals received from the GPS detector 35 and route calculated by the route calculation module 34 to select an appropriate map image from the map database 36 which is then passed by the map selector 37 to an output module 38 which generates display data causing a map 32 to be displayed on the display screen 31.

In this embodiment, the output module 38 in addition to being arranged to receive map images selected from the map database 36 by the map selector 37 is also arranged to receive route data from the route calculation module 34. The output module 38 then processes the received map image so as to blur all the areas in a map image, which do not correspond to roads on the identified route received from the route calculation module 34 and then outputs this modified map in use as display data. As these roads on the identified route appear sharp whereas the rest of the map appears blurred, the processing performed by the output module 38 provides a means for highlighting the driver's route.

Thus for example in the case of the map 32 shown in FIG. 6 a route from the bottom left-hand corner of the display 31 is highlighted comprising a route via Fortune Street, Duffrin Street, Dunhill Row, Bath Street, Nile Place and Provost Street up to the top of the map 32.

Additionally, however, as the method used to highlight route does not add additional information that needs to be processed by a driver, the highlighting is such to be less likely to be distracting to a driver in use when driving on the road.

Further, the selective use of blurring can also be used to provide a driver with an indication of when he was off route. Thus for example, in some embodiments, the current location of a vehicle could be indicated by a symbol appearing in the display 31. In such embodiments, when a vehicle departed from the planned route, the departure from the planned route would be indicated to the driver by the apparent change in appearance of the symbol when the symbol moved from a sharp region of an image into a blurred region.

Fourth Embodiment

A fourth embodiment of the present invention will now be described with reference to FIG. 7.

Figure 7:
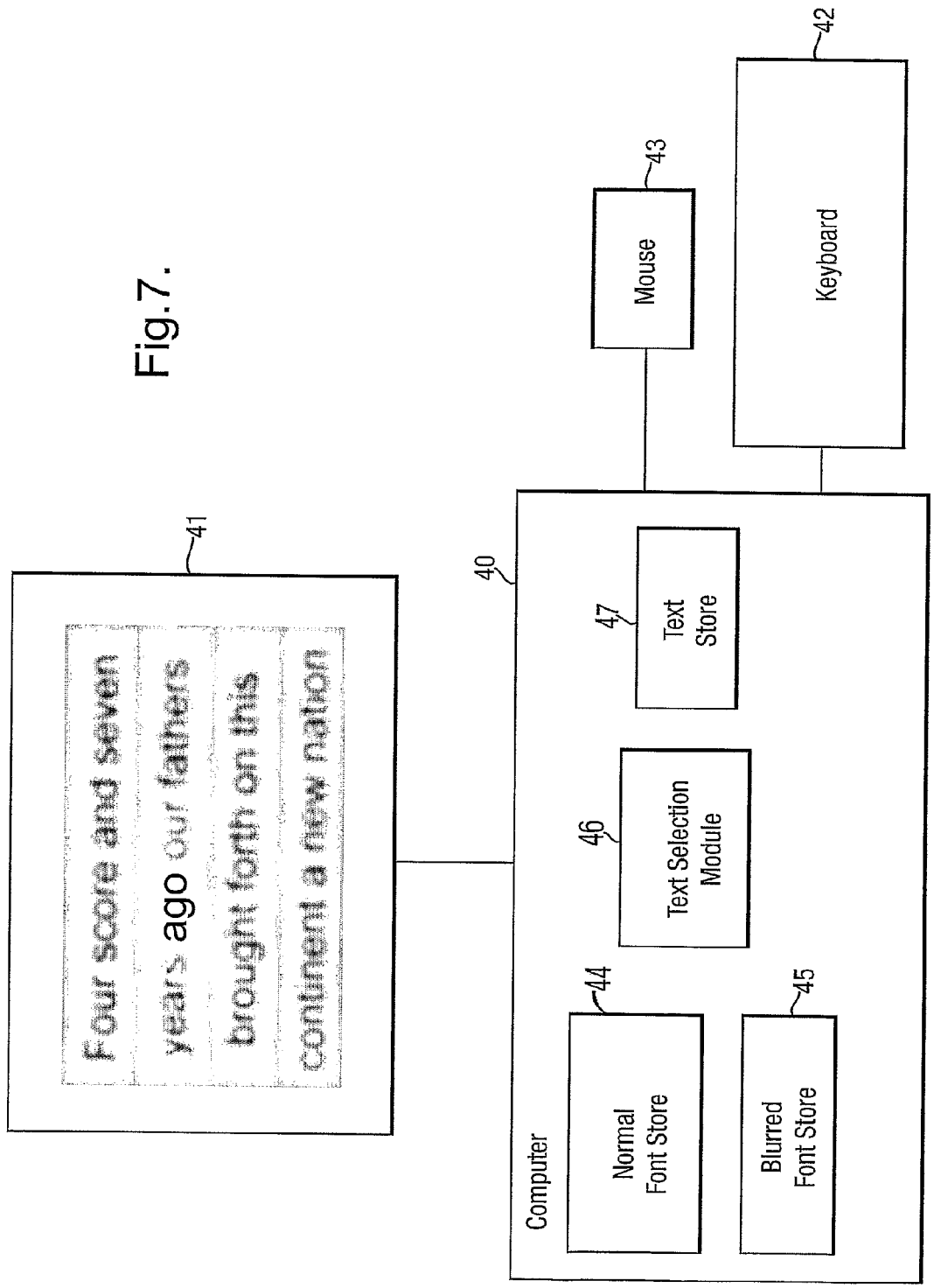
FIG. 7 is a schematic block diagram of a fourth embodiment of the present invention.

FIG. 7 is a schematic block diagram of a computer 40 connected to a display screen 41. In addition to being connected to the display screen 41 the computer 40 is also connected to a keyboard 42 and a mouse 43.

In this embodiment, the computer 40 is programmed so as to become configured as a system for helping children learn to read. To that end stored within the memory of the computer 40 are a number of functional modules shown as modules 44-47. Specifically in this embodiment, these modules comprise a normal font store 44, a blurred font store 45, a text selection module 46 and a text store 47.

The normal font store 44 stores font data defining a conventional typeface. In contrast, the blurred font store 45 stores font data for a modified version of the font stored within the normal font store 44. This modified font comprises data representing the same letters and symbols as are stored within the normal font store 44 where each of the symbols has had a blur function applied to it.

Thus for example where the normal font store 44 will store data representing for example the letter A a corresponding entry in the blurred font store 45 will have a representation of the same letter A but where the letter A appears blurred.

The text store 47 is arranged to store text, which is to be display on the display screen 41. The text selection module 46 is then arranged to receive instructions via the keyboard 42 and mouse 43 to select text stored from within the text store 47 and generate a display to be shown on the display screen 41.

In this embodiment in order to assist with learning to read, the text selection module 46 is arranged to highlight individual words or parts of words appearing on the display screen 41 in response to input instructions via the keyboard 42 or mouse 43 or through pre-programmed instructions. This is achieved by displaying most text utilising the blurred font stored within the blurred font store 45 and displaying text, which is to be highlighted using the normal font stared within the normal font store 44.

Thus for example as shown in FIG. 7 the opening words to the Gettysburg address are displayed on the screen 41 with the word "ago" being highlighted by being represented in the font corresponding to the normal font 44 whereas the rest of the text on the display screen 41 appears as a blurred font.

By having the text selection module 46 select text to be displayed on the screen 41 and then varying which words appearing on the screen are displayed in either the normal typeface stored within the normal font store 44 or the blurred font stored within the blurred font store 45, the computer 40 is able to direct a user's attention to that successive words in the text appearing on the screen 41.

It is believed that certain reading disabilities such as dyslexia arise due to an inability to separate an individual word or parts of words from the rest of text appearing on a page. The present embodiment would be particularly applicable for assisting dyslexics to read as the blurring of extraneous information reduces the cognitive load on the reader and hence should reduce the amount of confusion.

Fifth Embodiment

A fifth embodiment of the present invention will now be described with reference to FIGS. 8 and 9A-9D.

Figure 8:
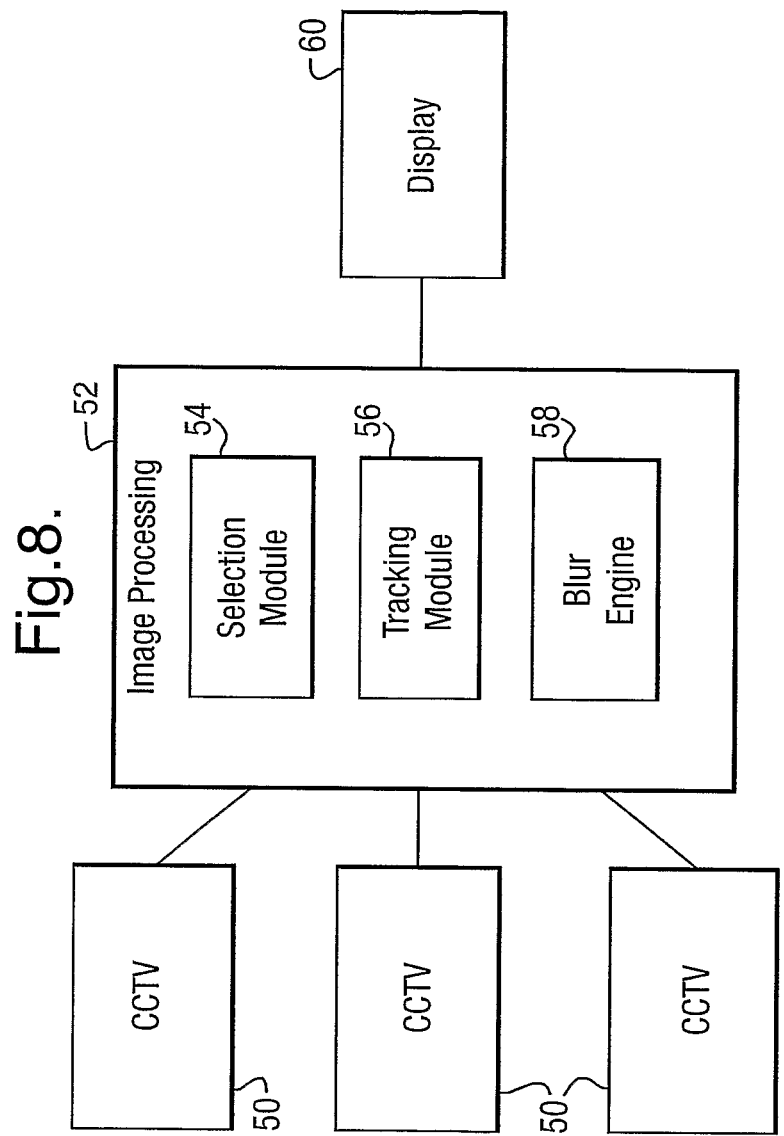
FIG. 8 is a schematic block diagram of a fifth embodiment of the present invention.

FIG. 8 is a schematic block diagram of a close circuit television system in accordance with a fifth embodiment of the present invention. In this embodiment a number of close circuit television cameras 50 of which three are illustrated in FIG. 8 are connected to an image processing system 52. The image processing system includes a selection module 54 for identifying individuals of interest within images obtained by the CCTV cameras 50; a tracking module 56 for tracking identified individuals of interest in images obtained by the CCTV cameras 50 and a blur engine 58. The image processing system 52 is arranged to receive image data from the CCTV cameras 50, process the data and cause processed data to be displayed on a display 60.

In this embodiment the blur engine 58 is arranged to process received images so as to outline individuals of interest and additionally blur the portions of an image which do not correspond to individuals of interest.

FIG. 9A is an exemplary image of a crowd scene in which for example four individuals are of interest. Conventionally once an individual can be identified by the selection module 54 the individuals in question could be tracked in the images by a tracking module 56. The individuals in question could then be highlighted by, for example, being outlined as is illustrated in FIG. 9B. A problem with such a system is that where images are obtained, and the background to an image is highly variable as is the case in a crowd scene, it is impossible to determine in advance a suitable colour for outlining areas of an image which are of interest. This is because it is impossible to determine in advance whether a portion of an image to be outlined lies within a light or a dark area of image and hence whether a particular colour will be a good contrast to that area of the image.

As discussed in the previous embodiments, selective blurring of an image's unwanted areas whilst maintaining the areas of interest to be sharp as an alternative means for highlighting areas of an image which are of interest.

Figure 9C:

FIG. 9C is an example of the same image of FIG. 9A where the same four individuals highlighted in FIG. 3B are highlighted with maintaining relevant portions of an image sharp whilst blurring the rest of the image. As can be seen from FIG. 3C, although it is possible to identify the four individuals who have been highlighted, this is difficult particularly in the cases of those individuals at the periphery of the image. The human visual system maintains only a small portion of an image in sharp focus. This area is known as the fovea. Only part of an image falling in the fovea will appear sharp to the human brain. Those areas falling outside the fovea will appear blurred. It is only by scanning the fovea across an entire image that the whole of the detail in a sharp image can be identified. This natural tendency of the human brain to blur peripheral aspects of an image means that where a wide angle of view is required, selectively blurring in order to highlight portions of an image may not be satisfactory.

Figure 9D:

Thus in accordance with this embodiment of the present invention the blur engine 58 is arranged to process images to both highlight portions of an image by blurring the other areas of an image and also by outlining the areas of an image which are designed to be highlighted. The result of such processing of the image of FIG. 9A highlighting the same portions as has been highlighted in FIGS. 9B and 9C is shown in FIG. 9D. As can be appreciated by comparing FIGS. 9B, 9C and 9D the combination of a selective blur and also outlining portions of an image ensures that all areas of interest are apparent to a viewer. Additionally, the blurred image contrasts with the sharp outline and hence even if the detail of an image can not be known in advance, the outline has a tendency not to merge with the rest of an image as is the case in FIG. 9B.

Figure 10:
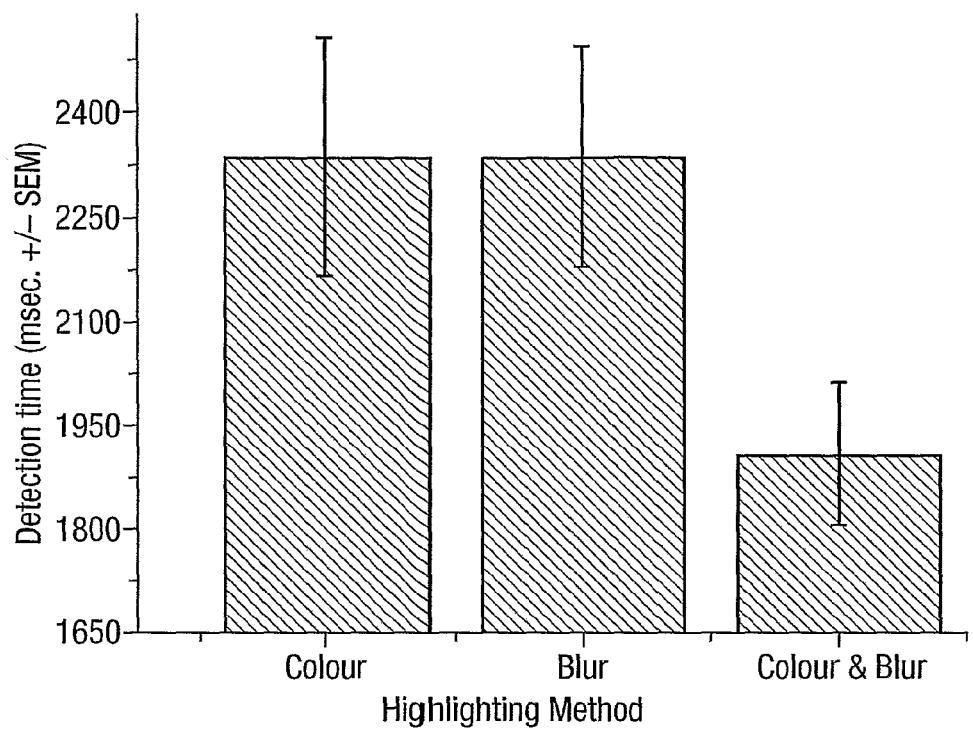
FIG. 10 is a graph illustrating experimental results of the reaction times for identifying multiple elements in a coloured display.

FIG. 10 is a graphical illustration of experimental results testing the detection time for identifying three items in a coloured display spread across a wide angle of view. In contrast to the experiment illustrated by the results of FIG. 2, a 10 by 10 array of numbers was presented to a viewer, three of which were highlighted using either a coloured outline, a blurring technique or both an outline and highlighting using selective blur. A user was then asked to identify whether the highlighted numbers were all even. The speed of which different arrays of numbers were presented to a user were not as high as in the previously described experiment and hence this experiment eliminated the additional consideration of cognitive and sensory overload previously described.

As can be seen from the results of FIG. 10 where a wide angle of view is required and sensory overload is not an issue, outlining using colour or highlighting using a selective blur technique obtain comparable results. However, a significant reduction in detection time is achieved when both the outlining of areas of interest and the blurring of areas which are not of interest are combined.

Sixth Embodiment

A sixth embodiment of the present invention will now be described with reference to FIG. 11. In the previous embodiments systems have been described in which selectively blurred images are generated by digital processing of digital images. In this embodiment an alternative system of highlighting a portion of an analogue display will be described.

Figure 11:
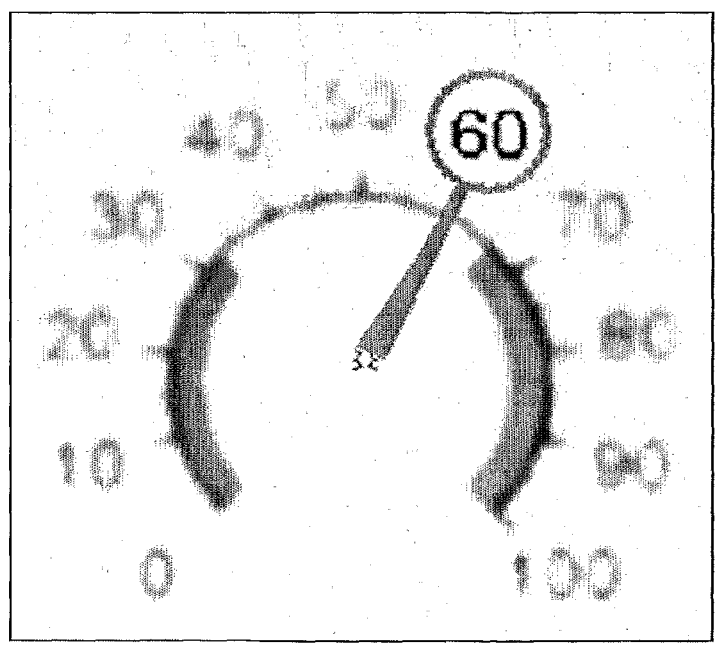
FIG. 11 is a schematic illustration of a dial in accordance with a sixth embodiment of the present invention.

FIG. 11 is a schematic illustration of a dial showing the numbers zero to 100. A current value of, for example, speed is indicated by a pointer pointing to a particular figure of the dial. In this embodiment in order to achieve a blurred representation of the majority of the dial with a sharp focused image for the current reading a thin defocusing lens disk with an aperture hole is provided. The defocusing lens is then attached to the upper surface of the pointer, with the aperture hole being located at the position at the end of the pointer indicating a current reading. The lens is connected to the pointer so that as the pointer rotates the item viewed through aperture hole appears in sharp focus whilst the remainder of the dial appears out of focus. Thus in this way a selective blurred image of the dial can be achieved without the requirement of any image processing software.

Seventh Embodiment

A seventh embodiment of the present invention will now be described with reference to FIGS. 12 and 13A-13C.

Figure 12:
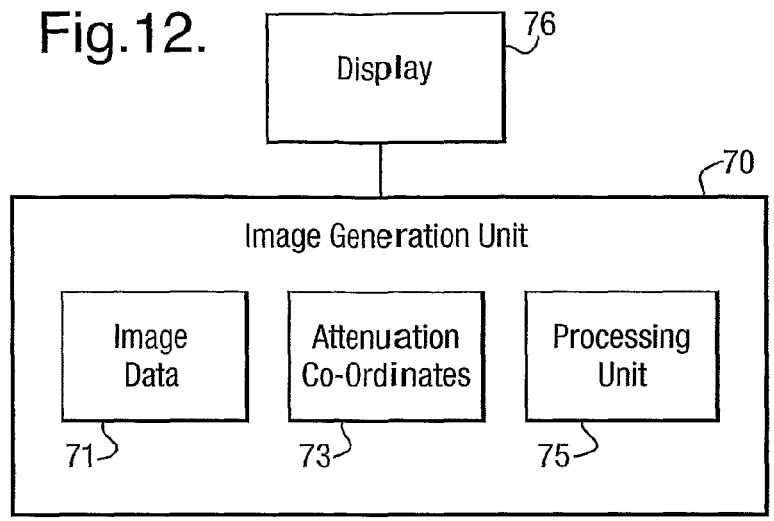
FIG. 12 is a schematic block diagram of a seventh embodiment of the present invention.

FIG. 12 is a schematic block diagram of an image generation system in accordance with a seventh embodiment of the present invention. The image generation system comprises an image generation unit 70 storing image data in an image data store 71, a set of attention co-ordinates 73 and a processing unit 75 for processing image data and the stored tension co-ordinates 73 to generate display data which is then displayed on a display 76.

The applicants have appreciated that as a users attention is ordinarily attracted towards the sharp portions of an image, by presenting an individual with a sequence of images where differing portions of the image are displayed in focus, a means is provided to direct a user's sequential interest to particular parts of an image.

One application of the present embodiment is for generating advertising displays where a user's attention is directed in a controlled manner to different areas of an advert.

Figure 13A:
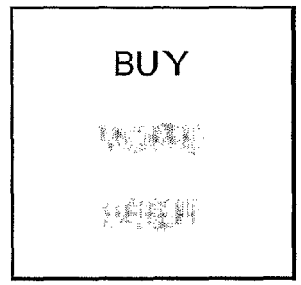
FIGS. 13A-13C are a illustrative sequence of images generated by the system in the seventh embodiment of the present invention.
Figure 13B:
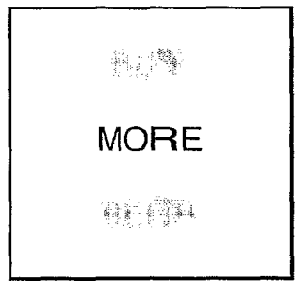
Figure 13C:
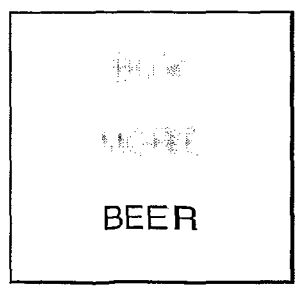

FIGS. 13A-13C are an illustration of a sequence of images displayed by the display 76 of the image generation system in this embodiment.

In FIG. 13A an advertisement is illustrated where the upper portion of the advertisement is in focus and the rest of the image is blurred. By displaying this image and then sequentially displaying the images of FIGS. 13B and 13C where respectively the central portion and a lower portion of the image is in focus with the rest of the image being blurred, a user's attention is directed in a predetermined way across the advertisement. The direction of a viewer's attention in this way enables an advertiser to make use of the primacy and recentcy with which particular aspects of adverts are viewed to reinforce particular aspects of an advertisement.

Further Modifications and Amendments

It will be appreciated that as the present invention provides an alternative means for highlighting information in a screen display, the present invention could be used in combination with other methods to enable a variety of different selections of image data, alpha numeric or text data to be simultaneously highlighted.

Thus for example some data might be highlighted by being displayed in a certain colour whilst data selected by different criteria were highlighted using the above described selective blurring technique. In this way, the intersection between to sets of data could be easily identified.

It will also be appreciated that although the drawings accompanying the description are black and white drawings, the present invention is equally applicable to colour displays. An advantage of the present invention when used with colour images would be that the selective blurring of an image would enable information to be highlighted without any loss of colour information or degradation of colour contrast.

In such embodiments, instead of processing a single image, colour data for each of the red, green and blue channels of an original image could be processed to generated selectively blurred red, green and blue images and then recombined in a conventional way to generate a selectively blurred colour image.

In the first embodiment, the generation of a single blurred image is described. It will be appreciated that in generating selectively blurred images, different portions of an image could be blurred to a lesser or greater extent. Where more than one level of blurring occurred, a means for identifying a priority for considering areas of an image is provided as ordinarily, a viewer's attention will progressively move from the sharpest to the least sharp areas of an image.

It will also be appreciated that although blurring of images using a Gaussian blur is described, in other embodiments any suitable technique for generating a blurred image could be utilised. Thus for example in the case of a two-tone image, dithering could be utilised. Alternatively, images could be blurred by utilising stored ramping or feathering algorithms to make areas of an image less distinct.

Further, although in the above embodiments the generation of blurred images is described where the images are generated through image processing, it will be appreciated that instead of generating blurred image data, adaptive optical systems could be provided which caused areas of a display to appear blurred to a viewer.

Although in the fourth embodiment, the pre-storing of blurred and sharp font data is described, it will be appreciated that more generally blurred and sharp image data could be pre-stored for generating any type of image display. Thus, for example, blurred and sharp icon data could be pre-stored so as to facilitate the generation of selectively blurred images including representations of icons.

In the fifth embodiment a CCTV camera system is described in which individuals are highlighted using a combination of selective blurring and outlining. It will be appreciated that such combined highlighting techniques could be used in other applications.

In the fifth embodiment, outlining and selective blur were combined to overcome the natural tendency of the human visual system to blur peripheral images and hence provide a means whereby selective blurring could be utilised in applications requiring a wide angle of view. It will be appreciated that other combined highlighting techniques could be used. In particular it will be appreciated that conventional highlighting techniques such as outlining or flashing could be used to direct a user's attention to a peripheral part of an image and then selective blur could be utilised to direct a user's attention in a particular area of an image after the conventional technique had been utilised to direct their general attention towards a selectively blurred portion of an image. Such a system could be combined with eye tracking to switch off the conventional highlighting system once it was established that a user's attention was focussed on the selectively blurred portion of an image.

It will further be appreciated that methods other than direct image processing could be used to generate a selectively blurred image.

Thus for example instead of processing images from CCTV cameras, a blurred and a sharp image could be obtained by using two cameras arranged by means of a beam splitter to have substantially same field of view. One of the cameras could then be arranged to obtain a blurred image by having a defocusing lens in the path between that camera and the field of view. In this way a blurred and a sharp version of the same image could be obtained without any computer processing. The image processing unit 52 could then select the relevant portions to be presented as blurred or sharp images from the respective images obtained by the two cameras.

Although seven embodiments of the present invention have been described in detail, it will be appreciated that the present invention will have many other applications. In general, the present invention is applicable in any complex decision making environment where it is desirable to draw a user's attention to specific portions or areas of a display.

Thus for example, in addition to the examples of cockpits and in-car navigation systems described in the first three embodiments, the present invention could also be applied to control rooms and simulation displays for safety critical systems such as for example air traffic control systems, integrated operations control systems for rail or public transport or safety control systems for power plants and factories etc. Equally, the present invention could be used to highlight information on trading screens in a financial trading system where it was desirable to direct a user's attention to certain information.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal, which may be conveyed via electrical or optical cable or by radio or other means.

When a program is embodied in a signal, which may be conveyed, directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

The invention claimed is:

1. An image generation apparatus, comprising:
   an image store storing image data defining an image;
   a data store storing data associating different portions of the image as portions of the image which are to be sequentially modulated with sequences of blurring values; and
   an image processing unit processing the stored image data to generate a sequence of composite images in which the portions of the image defined by image data are sequentially modulated, wherein portions of each composite image correspond to portions of the image defined by image data stored by the image store and in which other portions of the composite images in the sequence of images correspond to the other portions of the image defined by the image data stored by the image store to which a selected blurring function selected from a plurality of different blurring functions has been applied, the selected blurring functions applied being selected on the basis of the sequence of blurring values associated with the image portions which are to be sequentially modulated.

2. An image generation apparatus in accordance with claim 1 wherein said image processing unit generates a composite image by determining pixel data for areas of an image to be emphasized by copying image data for said pixels from image data stored by the image store and to determine pixel data for the remaining portions of a composite image by calculating for pixels in said remaining portions of a composite image a weighted average of stored image data weighted by a function dependent upon the distance between a pixel in an image for which pixel data is being generated and a corresponding pixel in said image being utilized to calculate said weighted average.

3. An image generation apparatus in accordance with claim 2 wherein said function dependent upon distance comprises a Gaussian function.

4. An image generation apparatus in accordance with claim 2 wherein said image processing unit comprises:

a function store storing function data defining a plurality of functions for deriving composite image data from image data stored by the image store in which some portions of a composite image correspond to said portions of the image defined by data stored in said image store and in which other portions of said composite image correspond to the other portions of the image defined by said data stored by the image store to which a blurring function has been applied;

a selection unit selecting function data defining a function from said function store on the basis of the one or more areas selected as portions of an image to be emphasized; and a processing unit generating a composite image utilizing image data stored by the data store and function data selected by said selection unit.

5. An image generation method, comprising:
   storing image data and data associating different portions of an image as portions of an image which are to be sequentially modulated with sequences of blurring values; and
   processing the stored image data to generate a sequence of composite images in which portions of the image defined by the stored image data are sequentially modulated, wherein portions of each composite image correspond to portions of the image defined by the stored image data and in which other portions of said composite images in the sequence of images correspond to the other portions of the image defined by said stored image data to which a selected blurring function selected from a plurality of different blurring functions has been applied, the selected blurring functions applied being selected on the basis of the sequence of blurring values associated with the image portions which are to be sequentially modulated.

6. A non-transitory computer readable medium storing computer implementable instructions for causing a programmable computer to:
   store image data and data associating different portions in an image as portions of an image which are to be sequentially modulated with sequences of blurring values; and
   process the stored image data to generate a sequence of composite images in which the portions of the image defined by the stored image data are sequentially modulated, wherein portions of each composite image correspond to portions of the image defined by the stored image data and in which other portions of said composite images in the sequence of images correspond to the other portions of the image defined by said stored image data to which a selected blurring function selected from a plurality of different blurring functions has been applied, the selected blurring functions applied being selected on the basis of the sequence of blurring values associated with the image portions which are to be sequentially modulated.

* * * * *

UNITED STATES PATENT AND TRADEMARK OFFICE
CERTIFICATE OF CORRECTION

| | | |
|---|---|---|
| PATENT NO. | : 8,649,551 B2 | Page 1 of 1 |
| APPLICATION NO. | : 10/594870 | |
| DATED | : February 11, 2014 | |
| INVENTOR(S) | : Yoav Tadmor | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1871 days.

Signed and Sealed this
Twenty-first Day of July, 2015

Michelle K. Lee
*Director of the United States Patent and Trademark Office*